United States Patent [19]

Takai et al.

[11] Patent Number: 5,525,398

[45] Date of Patent: Jun. 11, 1996

[54] PERPENDICULAR MAGNETIC RECORDING MEDIUM AND METHOD FOR MAKING

[75] Inventors: Mitsuru Takai; Koji Kobayashi, both of Miyota-machi; Jiro Yoshinari, Saku, all of Japan

[73] Assignee: TDK Corporation, Tokyo, Japan

[21] Appl. No.: 854,892

[22] Filed: Mar. 20, 1992

[30] Foreign Application Priority Data

Mar. 22, 1991 [JP] Japan ....................... 3-83289

[51] Int. Cl.⁶ ............... G11B 5/66; B32B 7/02; B32B 3/10
[52] U.S. Cl. .............. 428/141; 428/212; 428/336; 428/694 T; 428/694 TR; 428/694 TM; 428/694 TS; 428/900; 427/128; 427/132; 427/533; 360/134; 360/136
[58] Field of Search ................... 428/336, 694, 428/900, 212, 694 T, 694 TR, 694 TM, 212, 694 TS, 141; 427/128, 132, 50; 360/134, 136

[56] References Cited

U.S. PATENT DOCUMENTS

| | | | |
|---|---|---|---|
| 4,387,136 | 6/1983 | Saito et al. | 428/328 |
| 4,511,635 | 4/1985 | Nagao et al. | 428/694 |
| 4,521,481 | 6/1985 | Nagao et al. | 428/336 |
| 4,536,443 | 8/1985 | Nagao et al. | 428/336 |
| 4,596,735 | 6/1986 | Noguchi et al. | 428/215 |
| 4,622,271 | 11/1986 | Arai et al. | 428/615 |
| 4,770,924 | 9/1988 | Takai et al. | |
| 4,900,622 | 2/1990 | Nakayama et al. | |
| 4,999,220 | 3/1991 | Honda et al. | 427/132 |
| 5,000,995 | 3/1991 | Kishi et al. | 428/64 |
| 5,073,449 | 12/1991 | Niimi et al. | 428/336 |

FOREIGN PATENT DOCUMENTS

| | | |
|---|---|---|
| 58-14324 | 1/1973 | Japan . |
| 54-603 | 1/1979 | Japan . |
| 54-147010 | 11/1979 | Japan . |
| 56-26891 | 6/1981 | Japan . |
| 56-94520 | 7/1981 | Japan . |
| 56-42055 | 10/1981 | Japan . |
| 57-143730 | 9/1982 | Japan . |
| 57-147129 | 9/1982 | Japan . |
| 57-143731 | 9/1982 | Japan . |
| 57-141027 | 9/1982 | Japan . |
| 57-141028 | 9/1982 | Japan . |
| 57-141029 | 9/1982 | Japan . |
| 57-3233 | 10/1982 | Japan . |
| 58-50628 | 3/1983 | Japan . |
| 60-76025 | 4/1985 | Japan . |
| 60-37528 | 8/1985 | Japan . |
| 61-110333 | 5/1986 | Japan . |
| 61-187122 | 8/1986 | Japan . |
| 63-14320 | 1/1988 | Japan . |
| 63-14317 | 1/1988 | Japan . |
| 63-13117 | 1/1988 | Japan . |
| 63-39127 | 2/1988 | Japan . |
| 63-21254 | 5/1988 | Japan . |
| 63-10315 | 11/1988 | Japan . |
| 3207014 | 9/1991 | Japan . |
| 2072406 | 9/1981 | United Kingdom . |

*Primary Examiner*—L. Kiliman
*Attorney, Agent, or Firm*—Oblon, Spivak, McClelland, Maier & Neustadt

[57] ABSTRACT

A perpendicular magnetic recording medium has a magnetic layer comprised of two stacked sublayers each in the form of ferromagnetic metal thin film consisting of columnar crystal grains wherein the angle $\theta$ between the average growth direction of the columnar crystal grains and a normal to the substrate is $\theta \geq 45°$ for the lower sublayer and $\theta \leq 30°$ for the upper sublayer, and the mean maximum diameter of columnar crystal grains of the lower sublayer is not smaller than the mean maximum diameter of columnar crystal grains of the upper sublayer. An apparatus suitable for the evaporation of the magnetic layer is arranged as shown in the Figure. Magnetic flux associated with the upper sublayer finds an escape to the lower sublayer, preventing formation of a closed loop of magnetic flux within the columnar crystal grains of the upper sublayer. The lower sublayer is magnetized, thus contributing to an improvement in reproduction output.

10 Claims, 1 Drawing Sheet

PERPENDICULAR MAGNETIC RECORDING MEDIUM AND METHOD FOR MAKING

FIELD OF THE INVENTION

This invention relates to a magnetic recording medium of the perpendicular recording type having a magnetic layer in the form of ferromagnetic metal thin film consisting of columnar crystal grains deposited by .evaporation, and a method for preparing the same.

BACKGROUND OF THE INVENTION

In accordance with the recent demand for higher density of magnetic recording media, attention is paid on perpendicular magnetic recording media capable of high density recording while avoiding any influence of demagnetizing field in the magnetic layer in-plane direction.

Evaporated or sputtered films of Co—Cr series alloy are known as the magnetic layer for perpendicular magnetic recording media. In magnetic layers using a Co—Cr series alloy containing at least a certain amount of Cr, columnar crystal grains of the hexagonal system grow in a perpendicular direction with axis c aligned with the perpendicular direction.

Perpendicular magnetic recording media using a perpendicular magnetizable film of Co—Cr series alloy as the magnetic layer generally have a Permalloy film beneath the magnetic layer. The Permalloy film is effective for allowing magnetic flux to escape from each columnar crystal grain of the magnetic layer, thereby preventing formation of a closed loop within each columnar crystal grain due to demagnetizing field. If a closed loop were formed within the respective columnar crystal grains, no magnetic flux would extend beyond the magnetic layer surface, resulting in a substantial loss of output. The provision of a Permalloy film below the magnetic layer causes the magnetic flux of one columnar crystal grain to enter other columnar crystal grains, thus allowing for leakage of magnetic flux beyond the magnetic layer surface for enabling reproduction.

On the contrary, great efforts have been devoted on magnetic recording media using a ferromagnetic metal thin film of Cr-free Co base alloy, for example, Co base alloy having Ni and other elements added thereto, because of their high saturation magnetic flux density and high coercivity. If such a Co base alloy is perpendicularly grown like the Co—Cr series alloy, the resulting magnetic layer is not magnetizable perpendicularly due to the influence of demagnetizing field in the thickness direction. Thus this magnetic layer does not have an axis of easy magnetization or develop coercivity.

As a consequence, ferromagnetic metal thin film magnetic layers of Co base alloy such as Co—Ni alloy are generally formed by the oblique evaporation technique.

The oblique evaporation technique carries out evaporation by feeding a non-magnetic substrate around the surface of a rotating cylindrical chill drum and irradiating a stationary ferromagnetic metal source with an electron beam or the like. There was proposed a multi-layered structure in which more than one layer of ferromagnetic metal thin film is stacked by such an oblique evaporation technique. Generally in this case, columnar crystal grains of one ferromagnetic metal thin film layer are grown in a select direction intersecting the growth direction of columnar crystal grains of other ferromagnetic metal thin film layers (see Japanese Patent Publication Nos. 26891/1981, 42055/1981, 21254/1988 and 37528/1985 and Japanese Patent Application Kokai Nos. 603/1979, 147010/1979, 94520/1981, 3233/1982, 30228/1982, 13519/1982, 141027/1982, 41028/1982, 141029/1982, 143730/1982, 143731/1982, 147129/1982, 14324/1983, 50628/1983, 76025/1985, 110333/1986, 187122/1986, 10315/1988, 10315/1988, 13117/1988, 14317/1988, 14320/1988, and 39127/1988).

In this regard, the angle between the incident direction of ferromagnetic metal and a normal to the surface of the non-magnetic substrate is designated an incident angle. Evaporation is carried out such that the incident angle gradually decreases from the start to the end of evaporation. The rate of evaporation is minimum at the start of evaporation when the incident angle is at maximum and rapidly increases as the incident angle increases. As a consequence, the columnar crystal grains in the ferromagnetic metal thin film deposited on a non-magnetic substrate are oriented approximately parallel to the substrate surface where they are adjacent to the substrate, but rapidly raised up as they are spaced apart from the substrate surface, growing in an arcuate manner.

Such a ferromagnetic metal thin film has an axis of easy magnetization whose direction depends on the gradient of columnar crystal grains. Since the maximum incident angle is generally 90°, the gradient of columnar crystal grains largely depends on the minimum incident angle.

If the minimum incident angle is reduced, the gradient of columnar crystal grains with respect to a normal to the substrate is also reduced. Differently stated, columnar crystal grains stand up with respect to the substrate and their axis of easy magnetization also stands up with respect to the substrate.

Where a ferromagnetic metal thin film formed by such an oblique evaporation technique is applied to perpendicular magnetic recording media, it is necessary to prevent formation of a closed loop within columnar crystal grains and hence, to dispose a Permalloy film below the magnetic layer.

However, the Permalloy film which is an Fe—Ni alloy is less resistant against corrosion. In addition, local current can flow between the Co base alloy and the Fe base alloy, leaving a problem of corrosion resistance in this sense too. Further, the Permalloy film is a soft magnetic film which is non-magnetizable and contributes to no output improvement.

OBJECTS OF THE INVENTION

An object of the present invention is to provide a perpendicular magnetic recording medium featuring increased outputs and high corrosion resistance as well as a method for preparing the same.

This and other objects are accomplished in accordance with the present invention as defined below from (1) to (6).

(1) A perpendicular magnetic recording medium comprising on a substrate a magnetic layer comprised of two stacked sublayers each in the form of ferromagnetic metal thin film consisting of columnar crystal grains deposited by evaporation, characterized in that provided that $\theta$ is the angle between the average growth direction of the columnar crystal grains and a normal to the substrate, $\theta \geq 45°$ for the ferromagnetic metal thin film of the lower sublayer and $0 \leq 30°$ for the ferromagnetic metal thin film of the upper sublayer, and the mean maximum diameter of columnar crystal grains of the lower sublayer is not smaller than the mean maximum diameter of columnar crystal grains of the upper sublayer.

(2) The perpendicular magnetic recording medium of (1) wherein the ferromagnetic metal thin film of said lower sublayer is 500 to 1,500 Å thick and the ferromagnetic metal thin film of said upper sublayer is 500 to 2,000 Å thick.

(3) The perpendicular magnetic recording medium of (1) or (2) wherein said ferromagnetic metal thin film contains Co as a main component.

(4) The perpendicular magnetic recording medium of (3) wherein the ferromagnetic metal thin film of said lower sublayer comprises a Co—Ni base alloy and the ferromagnetic metal thin film of said upper sublayer comprises a Co—Cr base alloy.

(5) The perpendicular magnetic recording medium of any one of (1) to (4) wherein fine particles are disposed on the surface of said substrate, the substrate having the fine particles disposed thereon has a center line average roughness Ra of up to 40 Å, and said fine particles have a linkage proportion of up to 70%.

(6) A method for preparing a perpendicular magnetic recording medium as set forth in any one of (1) to (5), characterized by comprising the steps of separately furnishing a source for the evaporation of ferromagnetic metal thin film of the lower sublayer and a source for the evaporation of ferromagnetic metal thin film of the upper sublayer, and causing the respective sources to generate ferromagnetic metal vapors while feeding the substrate around the outer peripheral surface of a chill drum, thereby continuously depositing the ferromagnetic metal thin films of the lower and upper layers.

OPERATION AND ADVANTAGES OF THE INVENTION

The magnetic recording medium of the present invention has a magnetic layer comprised of two stacked sublayers each in the form of ferromagnetic metal thin film consisting of columnar crystal grains deposited by evaporation wherein θ (which is the angle between the average growth direction of columnar crystal grains and a normal to the substrate) is up to 30° for the ferromagnetic metal thin film of the upper sublayer and at least 45° for the ferromagnetic metal thin film of the lower sublayer.

The ferromagnetic metal thin film of the lower sublayer is effective for allowing magnetic flux to escape from the ferromagnetic metal thin film of the upper sublayer, preventing formation of a closed loop of magnetic flux within the columnar crystal grains of the upper sublayer. Since the mean maximum diameter of columnar crystal grains of the lower sublayer is equal to or larger than the mean maximum diameter of columnar crystal grains of the upper sublayer in the perpendicular magnetic recording medium of the invention, one columnar crystal grain of the lower sublayer straddles at least two columnar crystal grains of the upper sublayer so that the magnetic fluxes extending from columnar crystal grains of the upper sublayer may more readily escape to columnar crystal grains of the lower sublayer. The larger the mean maximum diameter of columnar crystal grains, the lower becomes the coercive force. This also allows the magnetic flux escape from the upper sublayer to the lower sublayer.

It will be understood that the ferromagnetic metal thin film of the lower sublayer is magnetized and thus contributes to output improvement. In general, signals of a longer wavelength have a greater recording depth. In general, a relatively larger mean maximum diameter of columnar crystal grains improves the output of low-band signals and a relatively smaller mean maximum diameter of columnar crystal grains improves the output of high-band signals. Then, the above-mentioned relationship between the grain diameters of columnar crystals in the two sublayers achieves output improvements over a wider band, and is also advantageous in recording longer wavelength signals in an overlapping manner since the upper and lower sublayers ensure reproduction outputs of high and low band signals in perpendicular magnetic recording, respectively.

Additionally, corrosion resistance is high enough because the ferromagnetic metal thin film of Co base alloy is more corrosion resistant than the Permalloy film and because both the upper and lower sublayers are formed of Co base alloy to prevent conduction of local current.

BEST MODE FOR CARRYING OUT THE INVENTION

Figure 1:
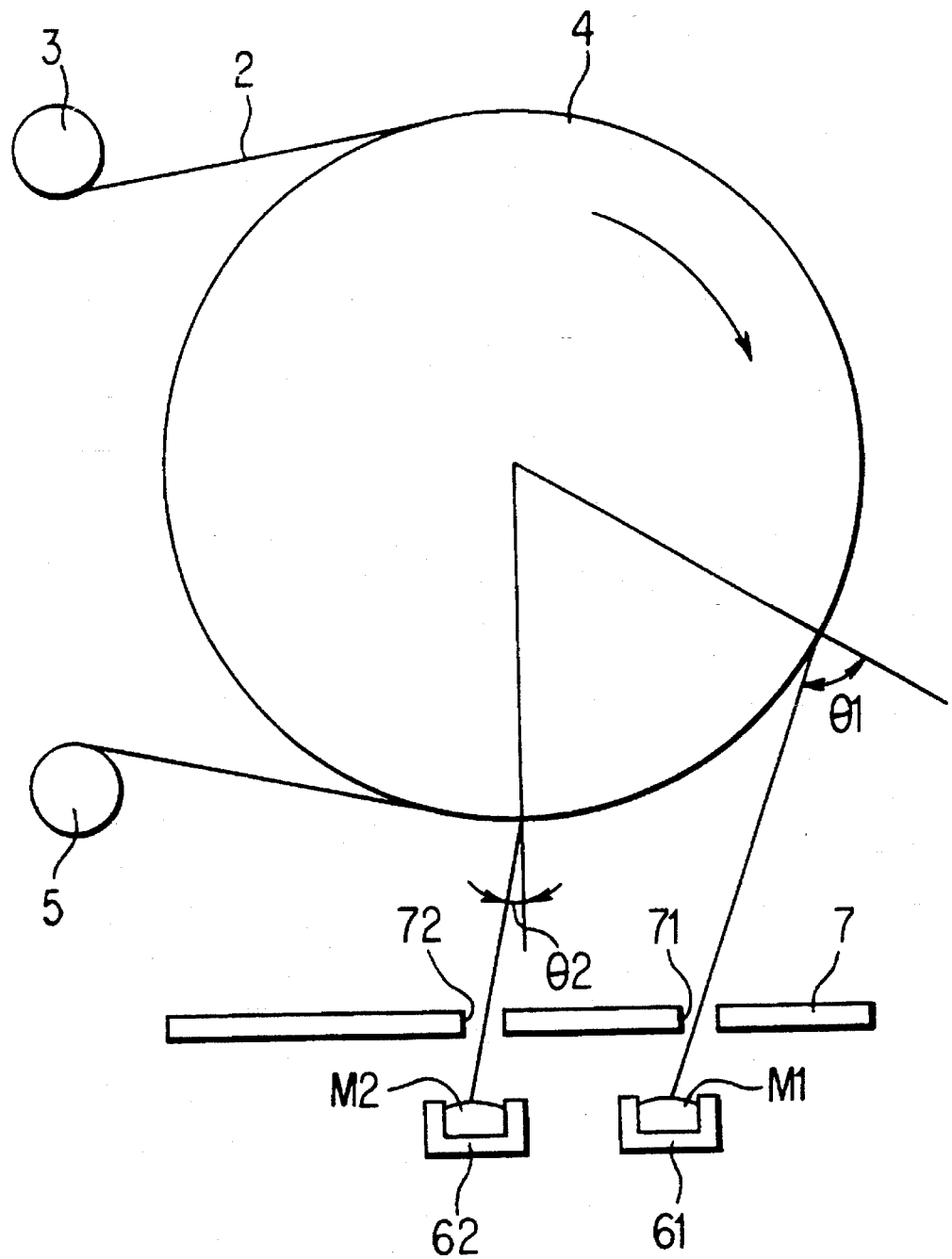
FIG. 1 is a view schematically illustrating one exemplary oblique evaporation apparatus used in the manufacture of a perpendicular magnetic recording medium in accordance with the present invention.

The illustrative construction of the present invention is now described in detail.

The perpendicular magnetic recording medium of the present invention has a magnetic layer on a substrate. The magnetic layer is comprised of two sublayers each in the form of ferromagnetic metal thin film consisting of columnar crystal grains deposited by evaporation. Provided that θ is the angle between the average growth direction of the columnar crystal grains and a normal to the substrate, θ≧45°, preferably θ≧55° for the ferromagnetic metal thin film of the lower sublayer and θ≦30°, preferably θ≦20° for the ferromagnetic metal thin film of the upper sublayer.

If θ for the ferromagnetic metal thin film of the lower sublayer is smaller than the above-defined range, the lower sublayer becomes less effective for preventing formation of a closed loop of magnetic flux within columnar crystal grains of the upper sublayer. The upper limit of θ for the lower sublayer is not particularly limited although it is difficult to deposit a ferromagnetic metal thin film with θ≧70° by the oblique evaporation technique.

If θ for the ferromagnetic metal thin film of the upper sublayer is larger than the above-defined range, it becomes difficult to provide a perpendicular magnetic recording film with appropriate magnetic properties.

The angle θ between the average growth direction of the columnar crystal grains and a normal to the substrate is measured as follows.

First, a magnetic recording medium is sectioned along a plane containing the growth direction of columnar crystal grains (which is normally a plane perpendicular to the major surface of the medium and containing the travel direction of the magnetic head). In the section, the columnar crystal grains of which the respective ferromagnetic metal thin films are formed appear as having an arcuate or columnar cross-section. The angle between the side of a columnar crystal grain (or the boundary line between adjacent columnar crystal grains) and a normal to the substrate as appearing in the section is measured on at least 100 columnar crystal grains for each of the ferromagnetic metal thin films. An average angle is then calculated from the angle measurements for each ferromagnetic metal thin film. This average angle is θ for each ferromagnetic metal thin film. It is to be noted that the position for θ measurement is an intermediate of the ferromagnetic metal thin film in a thickness direction.

It will be understood that θ depends on the incident direction of ferromagnetic metal and especially on the minimum incident angle θmin when the oblique evaporation technique is employed.

Where θ for the upper layer is not equal to 0°, the average growth directions of columnar crystal grains of the upper and lower sublayers may be either identical or opposite.

What is meant by identical average growth directions of columnar crystal grains is that when a plane perpendicular to the travel direction of the magnetic head is taken into account, the average growth directions of the upper and lower sublayers are on one side of said plane. The magnetic layer of such structure is readily obtained by moving the substrate in the same direction for both the upper and lower sublayers when ferromagnetic metal thin films are deposited by the oblique evaporation technique to be described later.

What is meant by opposite average growth directions of columnar crystal grains is that the average growth directions of the upper and lower sublayers intersects each other from opposite sides of said plane. In this case, a magnetic layer may be obtained in accordance with the oblique evaporation technique wherein the substrate moving direction during evaporation of the upper sublayer is reversed from the substrate moving direction during evaporation of the lower sublayer.

In the perpendicular magnetic recording medium of the present invention, the mean maximum diameter of columnar crystal grains of the lower sublayer is not smaller than the mean maximum diameter of columnar crystal grains of the upper sublayer for the reason mentioned previously.

Throughout the specification, the mean maximum diameter of columnar crystal grains is an average value of diameters, in a section of a ferromagnetic metal thin film along a plane containing the growth direction of columnar crystal grains, of columnar crystal grains at the thin film surface. Measurement may use a scanning or transmission electron microscope or the like.

The mean maximum diameter of columnar crystal grains of each sublayer may be properly determined in accordance with the standard and use to which the perpendicular magnetic recording medium of the invention is applied. Preferably, the mean maximum diameter of columnar crystal grains of the lower sublayer is from 1.1 to 2.0 provided that the mean maximum diameter of columnar crystal grains of the upper sublayer is unity. It is to be noted that the mean maximum diameter of columnar crystal grains of the ferromagnetic metal thin film is preferably in the range of from 50 to 500 Å, especially from 120 to 300 Å. Outside this range, film strength would become low, leaving a problem in durability.

The columnar crystal grains are hexagonal crystals, which can be identified by X-ray diffraction analysis. The mean grain diameter of hexagonal grains can be measured using a scanning electron microscope. In the practice of the present invention, like the maximum diameter of columnar crystal grains, the mean diameter of hexagonal grains of the ferromagnetic metal thin film of the lower sublayer is equal to or greater than that of the ferromagnetic metal thin film of the upper sublayer.

Each ferromagnetic metal thin film is deposited by the oblique evaporation technique to be described later while controlling the deposition conditions in order that the maximum diameter of columnar crystal grains of that ferromagnetic metal thin film have a predetermined value.

For example, as the amount of oxygen incorporated into the ferromagnetic metal thin film is increased, the maximum diameter of columnar crystal grains is reduced and the mean diameter of hexagonal grains is also reduced. Also a larger amount of oxygen incorporated provides higher corrosion resistance. There develops higher coercive force, which is advantageous for the recording of short wavelength signals to be recorded primarily in the upper sublayer.

Also, the mean maximum diameter of columnar crystal grains can be altered in accordance with the oblique evaporation technique to be described later by changing from sublayer to sublayer the angular velocity of a chill drum into which the substrate comes in contact and/or the power supplied to the ferromagnetic metal during evaporation. In this case, the thickness of the respective sublayers can also be altered at the same time.

The thickness of the ferromagnetic metal thin film upper sublayer is not particularly limited although it is often preferably at least 500 Å thick because a sufficient improvement in the low-band output is expectable. The thickness of the upper sublayer is not particularly limited and may be properly selected in accordance with the wavelength of signals to be recorded and so forth although it is often preferably up to 2,000 Å thick because a too thick upper sublayer would result in a lower reproduction output of short wavelength signals.

The thickness of the ferromagnetic metal thin film lower sublayer is not particularly limited too although it is often preferably at least 500 Å thick because a too thin film is fragile. Although columnar crystal grains of the lower sublayer must be deposited on the substrate nearly parallel thereto, it is difficult to deposit such a film to a substantial thickness by the oblique evaporation technique. Further a too thick lower sublayer would result in a lower reproduction output of short wavelength signals. For these reasons, the lower sublayer is often preferably up to 1,500 Å thick.

Each ferromagnetic metal thin film preferably consists of a Co base alloy containing Co as a main component. The preferred element contained in the alloy other than Co is Ni and/or Cr. Inclusion of Ni and/or Cr improves corrosion resistance.

The upper and lower sublayers may be identical or different in composition. For example, both the sublayers may be formed of a Co—Ni alloy and a lower sublayer of Co—Ni alloy with an upper sublayer of Co—Cr alloy is also acceptable. It is to be noted that the Co—Cr alloy, if used, should preferably be the upper sublayer because a thin film of Co—Cr alloy deposited in direct contact with the substrate cannot have grains properly oriented.

The content of elements other than Co may be properly determined in accordance with the magnetic properties, corrosion resistance and other requirements although the following composition are preferred.

Where the ferromagnetic metal thin film is formed of Co—Ni alloy, the atomic ratio of Co/(Co+Ni) preferably ranges from 0.75 to 0.90.

Where the ferromagnetic metal thin film is formed of Co—Cr alloy, the atomic ratio of Co/(Co+Cr) preferably ranges from 0.70 to 0.90.

In either case, a Co content lower than the above-defined range would fail to provide sufficient magnetic properties whereas a Co content in excess of the above-defined range would fail to provide sufficient corrosion resistance.

Each ferromagnetic metal thin film may contain oxygen if necessary. Inclusion of oxygen improves the coercive force and corrosion resistance of ferromagnetic metal thin film. Usually, oxygen is present at the surface of columnar crystal grains where it forms a bond with the metal. In the practice of the present invention, the oxygen concentration in the upper sublayer is preferably higher than the oxygen concentration in the lower sublayer.

In the ferromagnetic metal thin film, the atomic proportion (O/M) of oxygen content (O) to the total content of metal elements (M) is preferably up to 0.2, especially from 0.01 to 0.1. It will be understood that the oxygen concentration in ferromagnetic metal thin film can be measured by performing elemental analysis in accordance with Auger spectroscopy while etching the magnetic layer.

In addition to these elements, the ferromagnetic metal thin film may contain various trace components, especially transition elements, for example, Fe, Mn, V, Zr, Nb, Ta, Mo, W, Ti, Cu, Zn, etc.

The ferromagnetic metal thin films are deposited by evaporation, with an oblique evaporation technique being preferred for the deposition of the lower sublayer. An oblique evaporation technique may also be employed for the deposition of the upper sublayer. The oblique evaporation apparatus and method are not critical and a conventional one may be utilized.

The oblique evaporation technique involves, for example, feeding a length of film-shaped non-magnetic substrate unraveled from a supply roll around the surface of a rotating chill drum, evaporating metal from at least one stationary metal source to the substrate at an angle, and winding the substrate on a take-up roll. During the process, the incident angle continuously varies from the maximum incident angle θmax at the initial of evaporation to the minimum incident angle θmin at the end of evaporation so that columnar crystal grains of Co base ferromagnetic metal may grow on the non-magnetic substrate surface in an arcuate, aligned fashion.

It is essential for the present invention to stack two sublayers of ferromagnetic metal thin film. One exemplary practice of the present invention involves once winding a substrate having a lower sublayer of ferromagnetic metal thin film formed thereon on a take-up roll and moving the substrate again around the surface of a chill drum for forming an upper sublayer of ferromagnetic metal thin film. Higher production efficiency is accomplished by continuously forming two sublayers of ferromagnetic metal thin film on the substrate while the substrate is moving around the chill drum surface.

For the continuous formation of lower and upper sublayers, an evaporation apparatus having separate lower and upper sublayer evaporation sources as shown in FIG. 1 is preferably used. In FIG. 1, a substrate 2 in the form of a length of film is unraveled from a supply roll 3, fed around the outer peripheral surface of a chill drum 4 which rotates clockwise in the figure, and then wound on a take-up roll 5. A crucible 61 has received therein a source $M_1$ for the evaporation of the lower sublayer and another crucible 62 has received therein a source $M_2$ for the evaporation of the upper sublayer. The sources are heated by electron beams or the like to evaporate the ferromagnetic metal into vapor. Disposed between the chill drum 4 and the respective sources is a mask 7 defining slits 71 and 72. The ferromagnetic metal vapor from the source $M_1$ reaches the substrate 2 through the slit 71, depositing a ferromagnetic metal thin film which forms the lower sublayer. Similarly, the ferromagnetic metal vapor from the source $M_2$ reaches the substrate 2 through the slit 72, depositing a ferromagnetic metal thin film which forms the upper sublayer.

In the figure, $\theta_1$ and $\theta_2$ represent θ for the lower and upper sublayers, respectively. All the members shown in FIG. 1 are enclosed in a vacuum chamber which is not shown for brevity sake.

Understandably, the present invention encompasses an embodiment wherein the minimum incident angle θmin or maximum incident angle θmax of the upper sublayer is of a negative value. A negative angle θmin or θmax occurs when the oblique evaporation apparatus shown in FIG. 1 continues to evaporate the ferromagnetic metal on the substrate 2 even in a region beyond the lowest end of the chill drum 4. In addition to the apparatus of the arrangement shown in FIG. 1, the present invention may use an ordinary oblique evaporation apparatus having only one evaporation source. It is also possible in this case for θmin or θmax to assume a negative value.

Simply by controlling the distance between the respective evaporation sources and the substrate 2 and the power to the respective evaporation sources, the evaporation apparatus shown in FIG. 1 can be operated such that the mean maximum diameter of columnar crystal grains of the lower sublayer is not smaller than the mean maximum diameter of columnar crystal grains of the upper sublayer.

Although no particular limit is imposed on the method of introducing oxygen into the ferromagnetic metal thin film, easy introduction is accomplished by introducing oxygen gas into a film depositing atmosphere where evaporation is carried out. Alternatively, oxygen can also be introduced into the ferromagnetic metal thin film by treating the film surface with oxygen gas or a plasma thereof.

The material of which the substrate used herein is formed is not particularly limited as long as it is non-magnetic, and various films which are resistant against the heat encountered during evaporation of ferromagnetic metal thin film, for example, polyethylene terephthalate may be used. Also the materials described in Japanese Patent Application Kokai No. 10315/1988 are useful.

The substrate used herein is preferably provided on the surface with fine protrusions. Since the magnetic layer is an evaporated, extremely thin film, the topology of the substrate surface is directly reflected by the magnetic layer surface. Consequently, the provision of fine protrusions on the substrate surface ensures that the overlying magnetic layer has fine protrusions on the surface. The fine protrusions on the magnetic layer surface reduce the friction of the magnetic layer, improving tape travel and enhancing the durability of the medium.

Although no particular limit is imposed on the topography and preparation of fine protrusions on the substrate surface, it is preferred in the practice of the present invention to dispose fine particles on the substrate surface for providing protrusions because the protrusion distribution pattern and the surface roughness of the substrate having protrusions affect the magnetic properties, especially coercive force of the magnetic layer.

The fine particles which can be used herein include granular, especially substantially spherical particles, for example, inorganic particles containing at least one of oxides, sulfates, carbonates, and the like such as $SiO_2$, $Al_2O_3$, $MgO$, $ZnO$, $MgCO_3$, $CaCO_3$, $CaSO_4$, $BaSO_4$, $TiO_2$, etc. and oxides or acid salts of metals such as Si, Al, Mg, Ca, Ba, Zn, Mn, etc. and spherical particles of at least one of organic compounds such as polystyrene, polyesters, polyamides and polyethylene. These fine particles may be either magnetic or non-magnetic.

Preferably, the fine particles have a mean particle size of from 100 to 1,000 Å, especially from 300 to 600 Å. A mean particle size of less than this range would be less effective for friction reduction and durability improvement. A mean particle size of larger than this range would result in a magnetic layer having a larger surface roughness with disadvantages including the difficulty of achieving a center line average roughness Ra to be described later, a lowering of coercive force, and poor high-frequency properties.

The distribution density or population of fine particles is preferably $10^5$ to $10^8$ particles, especially $10^6$ to $7 \times 10^7$ particles per square millimeter. With a too low distribution density, the disposition of fine particles would become less effective. A too high distribution density would achieve no further improvement and render it difficult to achieve a linkage factor to be described later.

Preferably, the fine particles are distributed as uniformly as possible. It is not preferred that particles coalesce together or gather too closely because they behave as apparently large particles (or secondary particles). The degree of approach between fine particles is defined herein as a linkage factor. Assume that R is the diameter of a particle disposed on the substrate surface and d is the distance from that particle to an adjacent particle, the definition of linkage factor is:

Linkage factor=(the number per unit area of those particles satisfying $d<R$)/(the number per unit area of particles)×100

(as expressed in %). It is to be noted that R is given by a mean particle diameter and the particle-to-particle distance d and the number of particles are measured by means of an electron microscope.

In the present invention, the linkage factor is preferably up to 70%, especially from 0 to 60%. With a linkage factor in excess of this range, fine particles behave as secondary particles so that growth directions of columnar crystal grains are aligned with difficulty, resulting in a low coercive force, and after a magnetic layer is subsequently formed, protrusions of extremely larger diameter and height appear on the magnetic layer surface so that the magnetic layer has poor surface properties, resulting in a lowering of electromagnetic properties due to a spacing loss.

The substrate having fine particles disposed thereon preferably has a center line average roughness Ra of up to 40 Å, especially up to 30 Å. With Ra in excess of this range, growth directions of columnar crystal grains are aligned with difficulty, resulting in a low coercive force. It is to be noted that Ra is preferably at least 10 Å since a too low Ra would lead to insufficient friction reduction and lower durability.

No particular limit is imposed on the method of disposing fine particles on the substrate surface. For example, desirable methods used herein are by coating to the substrate a dispersion of fine particles in a thin binder which is obtained by dissolving a synthetic resin in a solvent, or by coating such a binder to the substrate followed by applying fine particles thereon.

On the magnetic layer of the perpendicular magnetic recording medium according to the present invention, any of various well-known topcoat layers is preferably disposed for the purposes of protecting the magnetic layer and improving corrosion resistance. To ensure smooth tape travel, any of various well-known backcoat layers is preferably disposed on the side of the non-magnetic substrate opposite to the magnetic layer.

The perpendicular magnetic recording media of the present invention are adapted for various modes of perpendicular magnetic recording in which the magnetic layer is magnetized in a perpendicular direction. The media can be advantageously applied to both analog and digital magnetic recording operations.

INDUSTRIAL APPLICABILITY

The perpendicular magnetic recording medium of the present invention allows magnetic flux to escape from the ferromagnetic metal thin film of the upper sublayer to the ferromagnetic metal thin film of the lower sublayer, thereby preventing formation of a closed loop within columnar crystal grains of the upper sublayer. Also, the ferromagnetic metal thin film of the lower sublayer is magnetized, contributing to an increased output. Especially the feature that the mean maximum diameter of columnar crystal grains of the lower sublayer is not smaller than the mean maximum diameter of columnar crystal grains of the upper sublayer permits the magnetic flux associated with the upper sublayer to readily find an escape to the lower sublayer, is effective for improving the reproduction output of long-wavelength signals having an increased recording depth, and provides increased outputs over a wider band.

Additionally, excellent corrosion resistance is obtained since ferromagnetic metal thin films of Co base alloy are more corrosion resistant than Permalloy films and the upper and lower sublayers may have essentially similar compositions.

EXAMPLE

Examples of the present invention are given below by way of illustration.

A suspension was prepared by thoroughly mixing and dispersing a blend containing 0.15% by weight of $SiO_2$ (mean particle size 300 Å) as fine particles, 0.2% by weight of methyl cellulose as a binder, 0.02% by weight of [N-β-(aminoethyl)-γ-aminopropylmethyldimethoxysilane] as a silane coupling agent, and the balance of water as a solvent. The suspension was applied to a surface of a polyethylene terephthalate (PET) substrate of 7 μm thick and dried.

After drying, the substrate had a fine particle distribution density of $10^7$ particles/mm$^2$, a linkage factor of 50%, and Ra of 30 Å on the surface.

Next, magnetic recording medium samples were prepared using an evaporation apparatus of the arrangement shown in FIG. 1 where a ferromagnetic metal thin film for the lower sublayer and a ferromagnetic metal thin film for the upper sublayer were deposited on the substrate surface by evaporation. During deposition of ferromagnetic metal thin films, a gas mixture of Ar gas and $O_2$ gas was passed through the vacuum chamber to maintain a pressure of $10^{-4}$ Torr therein.

During the process, θ's for the lower and upper sublayers were adjusted by changing the relative positions of evaporation sources $M_1$ and $M_2$ to slits 71 and 72. The mean maximum diameters of columnar crystal grains of the respective sublayers were adjusted by controlling the power of electron beams directed to the respective evaporation sources, the amount of $O_2$ gas introduced into the vacuum chamber, and the temperature of the chill drum.

Table 1 shows for each sample the composition and thickness of ferromagnetic metal thin films, the mean maximum diameter of columnar crystal grains, and the angle θ between the average growth direction of the columnar crystal grains and a normal to the substrate. Co—Ni and Co—Cr reported in Table 1 were both alloys containing 80 atom % of Co. It is to be noted that the mean maximum diameter and θ were measured by the previously described methods in which the number of columnar crystal grains on measurement was 100.

In addition to these samples, a reference sample in which a single layer of ferromagnetic metal thin film was formed was prepared for comparison purpose (Sample No. 1).

The samples were slit into tapes of 8 mm wide.

Simulating perpendicular magnetic recording by means of an annular magnetic head, signals having a frequency of 10 MHz were recorded in the sample tapes and reproduced outputs were measured. Also, recording of signals of 1 MHz was followed by measurement of reproduced outputs. It is to be noted that a Hi-8 standard video deck (SONY EV-900) was used for these measurements.

The results are shown in Table 1.

TABLE 1

| Sample No. | Composition Lower | Composition Upper | $\theta$ (°) Lower | $\theta$ (°) Upper | Mean maximum diameter (Å) Lower | Mean maximum diameter (Å) Upper | Thickness (Å) Lower | Thickness (Å) Upper | Reproduced output (dB) 1 MHz | Reproduced output (dB) 10 MHz |
|---|---|---|---|---|---|---|---|---|---|---|
| 1* | — | Co—Ni | — | 20 | — | 200 | — | 1500 | 0 | 0 |
| 2* | Co—Ni | Co—Ni | 30 | 20 | 250 | 150 | 1000 | 1000 | +4.5 | −0.3 |
| 3* | Co—Ni | Co—Ni | 50 | 40 | 250 | 150 | 1000 | 1000 | +4.0 | −0.8 |
| 4 | Co—Ni | Co—Ni | 55 | 20 | 250 | 200 | 1000 | 1000 | +4.0 | +3.5 |
| 5* | Co—Ni | Co—Ni | 55 | 20 | 100 | 250 | 1000 | 1000 | +3.8 | +0.5 |
| 6 | Co—Ni | Co—Ni | 55 | 20 | 250 | 200 | 2000 | 1000 | +5.2 | +0.9 |
| 7 | Co—Ni | Co—Cr | 55 | 20 | 250 | 200 | 1000 | 1000 | +5.0 | +3.4 |

*comparison

The advantages of the present invention are evident from the results of Table 1. More particularly, the samples of the present invention in which θ's for the upper and lower sublayers are within the specific ranges and the mean maximum diameter of columnar crystal grains of the lower sublayer is larger than the mean maximum diameter of columnar crystal grains of the upper sublayer showed a substantial improvement in 10-MHz signal reproduction output over the reference sample as well as an improvement in 1-MHz signal reproduction output.

We claim:

1. A perpendicular magnetic recording medium comprising:
   on a substrate, a magnetic layer comprised of two stacked sublayers, an upper sublayer and a lower sublayer each in the form of a ferromagnetic metal thin film consisting of columnar crystal grains deposited by evaporation, said crystal grains having an average growth direction and a mean maximum diameter,
   characterized in that θ is the angle between the average growth direction of the columnar crystal grains and a normal to the substrate, θ being ≧45° for the ferromagnetic metal thin film of the lower sublayer and θ being ≦30° for the ferromagnetic metal thin film of the upper sublayer, and the mean maximum diameter of columnar crystal grains of the lower sublayer is greater than the mean maximum diameter of columnar crystal grains of the upper sublayer.

2. The perpendicular magnetic recording medium of claim 1 wherein the ferromagnetic metal thin film of said lower sublayer is 500 to 1,500 Å thick and the ferromagnetic metal thin film of said upper sublayer is 500 to 2,000 Å thick.

3. The perpendicular magnetic recording medium of claim 1 or 2 wherein said ferromagnetic metal thin film contains Co as a main component.

4. The perpendicular magnetic recording medium of claim 3 wherein the ferromagnetic metal thin film of said lower sublayer comprises a Co—Ni alloy and the ferromagnetic metal thin film of said upper sublayer comprises a Co—Cr alloy.

5. The perpendicular magnetic recording medium of claim 3 wherein particles are disposed on the surface of said substrate, the substrate having a center line average roughness Ra of up to 40 Å, and said particles having a linkage factor of up to 70%.

6. The perpendicular magnetic recording medium of any one of claims 1, 2 or to 4 wherein particles are disposed on the surface of said substrate, the substrate having a center line average roughness Ra of up to 40 Å, and said particles having a linkage factor of up to 70%.

7. The perpendicular magnetic recording medium of claim 5 wherein said particles have a mean particle size of from 100 to 1000 Å.

8. The perpendicular magnetic recording medium of claim 6 wherein said particles have a mean particle size of from 100 to 1000 Å.

9. The perpendicular magnetic recording medium of claim 7, wherein said particles have a mean particle size of from 300 to 600 Å.

10. The perpendicular magnetic recording medium of claim 8 wherein said particles have a mean particle size of from 300 to 600 Å.

* * * * *

UNITED STATES PATENT AND TRADEMARK OFFICE
CERTIFICATE OF CORRECTION

PATENT NO. : 5,525,398
DATED : June 11, 1996
INVENTOR(S) : Mitsuru TAKAI, et al.

It is certified that error appears in the above-identified patent and that said Letters Patent is hereby corrected as shown below:

On the title page, "[75] Inventors: Mitsuru Takai; Koji Kobayashi, both of Miyota-machi; Jiro Yoshinari, Saku, all of Japan" should read --[75] Inventors: Mitsuru Takai; Koji Kobayashi; Jiro Yoshinari, all of Nagano Japan--.

Column 12, line 39, "1, 2 or to 4" should read
--1, 2 or 4--.

Signed and Sealed this

Sixth Day of January, 1998

Attest:

BRUCE LEHMAN

*Attesting Officer*     *Commissioner of Patents and Trademarks*